(12) United States Patent
Kuo

(10) Patent No.: US 7,209,868 B2
(45) Date of Patent: Apr. 24, 2007

(54) SIGNAL MONITORING SYSTEM AND METHOD

(75) Inventor: Heng-Chen Kuo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/025,887

(22) Filed: Dec. 28, 2004

(65) Prior Publication Data
US 2005/0187642 A1    Aug. 25, 2005

(30) Foreign Application Priority Data
Feb. 19, 2004    (CN) ........................ 2004 1 0015437

(51) Int. Cl.
*G05B 15/00* (2006.01)
(52) U.S. Cl. ...................... 702/189; 702/126; 702/127; 713/340
(58) Field of Classification Search ................ 702/189, 702/57, 63, 64, 124, 126, 127, 130, 132, 702/136, 198, 188; 713/300, 320, 340
See application file for complete search history.

(56) References Cited

U.S. PATENT DOCUMENTS

| | | | |
|---|---|---|---|
| 4,704,609 A | | 11/1987 | Rittenberry et al. ... 340/870.13 |
| 5,619,430 A | * | 4/1997 | Nolan et al. ................... 702/63 |
| 5,774,733 A | * | 6/1998 | Nolan et al. ................. 713/300 |
| 5,936,520 A | * | 8/1999 | Luitje et al. ................. 340/517 |
| 6,148,418 A | * | 11/2000 | Wang et al. ................... 714/25 |
| 6,317,034 B1 | * | 11/2001 | Issa et al. .............. 340/426.25 |
| 6,681,342 B2 | * | 1/2004 | Johnson et al. ............... 714/30 |
| 6,744,376 B1 | * | 6/2004 | Pascalidis .............. 340/870.21 |

\* cited by examiner

*Primary Examiner*—Hal Wachsman
(74) *Attorney, Agent, or Firm*—Wei-Te Chung

(57) ABSTRACT

A signal monitoring system includes four sensors, a multiplexer, a signal converting circuit, and a monitor chip. The multiplexer is electrically connected to the sensors for receiving the signals from the sensors. The multiplexer includes two selecting ports for selecting one of the sensors to communicate with the multiplexer, and a data bus for transmitting the signals generated by the selected sensor. The signal converting circuit includes an ADC electrically connected to the multiplexer for converting analog signals output therefrom to digital signals, and an MCU electrically connected to the ADC and the multiplexer. The MCU includes a digital port electrically connected to the monitor chip for outputting digital signals thereto, and a timer electrically connected to the monitor chip for outputting pulse signals thereto. The monitor chip is for processing the digital signals or pulse signals. A related signal monitoring method is also disclosed.

5 Claims, 3 Drawing Sheets

SIGNAL MONITORING SYSTEM AND METHOD

BACKGROUND OF THE INVENTION

1. Field of the Invention

The present invention relates to signal monitoring systems and methods used for checking and controlling apparatuses such as electronic equipment, and particularly to a signal monitoring system and method that can monitor plural signals by only employing a single data bus.

2. Description of Prior Art

Generally, an electrical system can be wired so that various monitoring signals such as voltage signals or temperature signals are generated. The monitoring signals correspond to measurements of various critical functions of the electrical system, which are determined according to practical requirements. A good example is the temperature of a central processing unit (CPU) in a personal computer system. The temperature should be monitored in order to prevent the CPU from overheating and failing, for example when a fan on the CPU malfunctions. A signal monitoring system is provided to fulfill the above-mentioned object. The signal monitoring system generally includes a temperature sensor for measuring the temperature of the CPU, generating temperature signals, and transmitting the temperature signals to a monitor chip via a data bus. Thereupon the monitor chip may send a control signal to shut down the CPU in order to prevent the CPU from overheating.

The above-mentioned signal monitoring system can include a plurality of sensors for monitoring a plurality of functions and for transmitting corresponding generated signals to the monitor chip via a respective data bus. The signals may, for example, be one or more voltage signals. FIG. 3 is a simplified block diagram of hardware infrastructure of the above-mentioned signal monitoring system. The signal monitoring system includes a plurality of sensors 110, 120, 130, 140, a plurality of data buses 210, 220, 230, 240, and a monitor chip 300. Each of the sensors 110, 120, 130, 140 is electrically connected to the monitor chip 300 via a respective one of the data buses 210, 220, 230, 240. The sensors 110, 120, 130, 140 generate signals, and transmit the signals to the monitor chip 300 via corresponding data buses 210, 220, 230, 240. The monitor chip 300 processes the signals generated by the sensors 110, 120, 130, 140.

The above-mentioned signal monitoring system is capable of monitoring plural signals by employing the plurality of data buses 210, 220, 230, 240. Each of the data buses 210, 220, 230, 240 connects one of the sensors 110, 120, 130, 140 with the monitor chip 300. That is, the monitor chip 300 can only control a particular class of signal via a respective single data bus. As a result, the more sensors there are, the more data buses are needed for transmitting the signals generated by the sensors. In practice, this means that the number of classes of signals that the monitor chip 300 can process is limited. Consequently, a signal monitoring system and method that can monitor plural signals by only employing a single data bus is desired.

SUMMARY OF THE INVENTION

A first object of the present invention is to provide a signal monitoring system that can monitor plural signals by only employing a single data bus.

A second object of the present invention is to provide a signal monitoring method that can monitor plural signals by only employing a single data bus.

In order to fulfill the above-mentioned first object, the present invention provides a signal monitoring system that can monitor plural signals by only employing a single data bus. The signal monitoring system includes a plurality of sensors, a multiplexer, a signal converting circuit, and a monitor chip. The sensors are used for generating signals. The multiplexer is electrically connected to the sensors for receiving the signals generated by the sensors. The multiplexer includes a plurality of selecting ports for selecting one of the sensors to communicate with the multiplexer, and a data bus for transmitting the signals generated by the selected sensor. The signal converting circuit includes an analog to digital converter (ADC) electrically connected to the multiplexer for converting analog signals output therefrom to digital signals, and a micro control unit (MCU). The MCU is electrically connected to the multiplexer for receiving digital signals or pulse signals output therefrom, and is electrically connected to the ADC for receiving digital signals output therefrom. Further, the MCU is electrically connected to the selecting ports for sending a voltage signal to each of the selecting ports to select one of the sensors to communicate with the multiplexer. The voltage signal sent to each of the selecting ports is a high voltage signal or a low voltage signal. The MCU includes a digital port electrically connected to the monitor chip for outputting digital signals thereto, and a timer electrically connected to the monitor chip for outputting pulse signals thereto. The monitor chip is for processing the digital signals or pulse signals.

In order to fulfill the above-mentioned second object, the present invention provides a signal monitoring method that can monitor plural signals by only employing a single data bus. The signal monitoring method including the steps of: (a) selecting one of sensors to communicate with a multiplexer; (b) determining whether signals generated by the selected sensor are analog signals, or digital signals or pulse signals; (c) transmitting the signals to an analog to digital converter (ADC) if the signals are analog signals, and transmitting the signals to a micro control unit (MCU) if the signals are digital signals or pulse signals; (d) determining whether the signals input to MCU are digital signals or pulse signals; (e) outputting the signals to a monitor chip via a digital port of the MCU if the signals are digital signals, and outputting the signals to the monitor chip via a timer of the MCU if the signals are pulse signals; and (f) processing the digital signals or the pulse signals in the monitor chip. Step (a) further includes the step of sending a voltage signal to each of the selecting ports of the multiplexer. The voltage signal sent to each of the selecting ports is a high voltage signal or a low voltage signal.

Step (c) further includes the step of converting the analog signals to digital signals, and transmitting the converted digital signals to the MCU.

The signal monitoring system can include any number of sensors according to particular requirements. In such cases, the required number of selecting ports of the multiplexer is provided. For example, the multiplexer may have three or four selecting ports.

Other objects, advantages and novel features of the present invention will become more apparent from the following detailed description when taken in conjunction with the accompanying drawings:

DETAILED DESCRIPTION OF THE INVENTION

Figure 1:
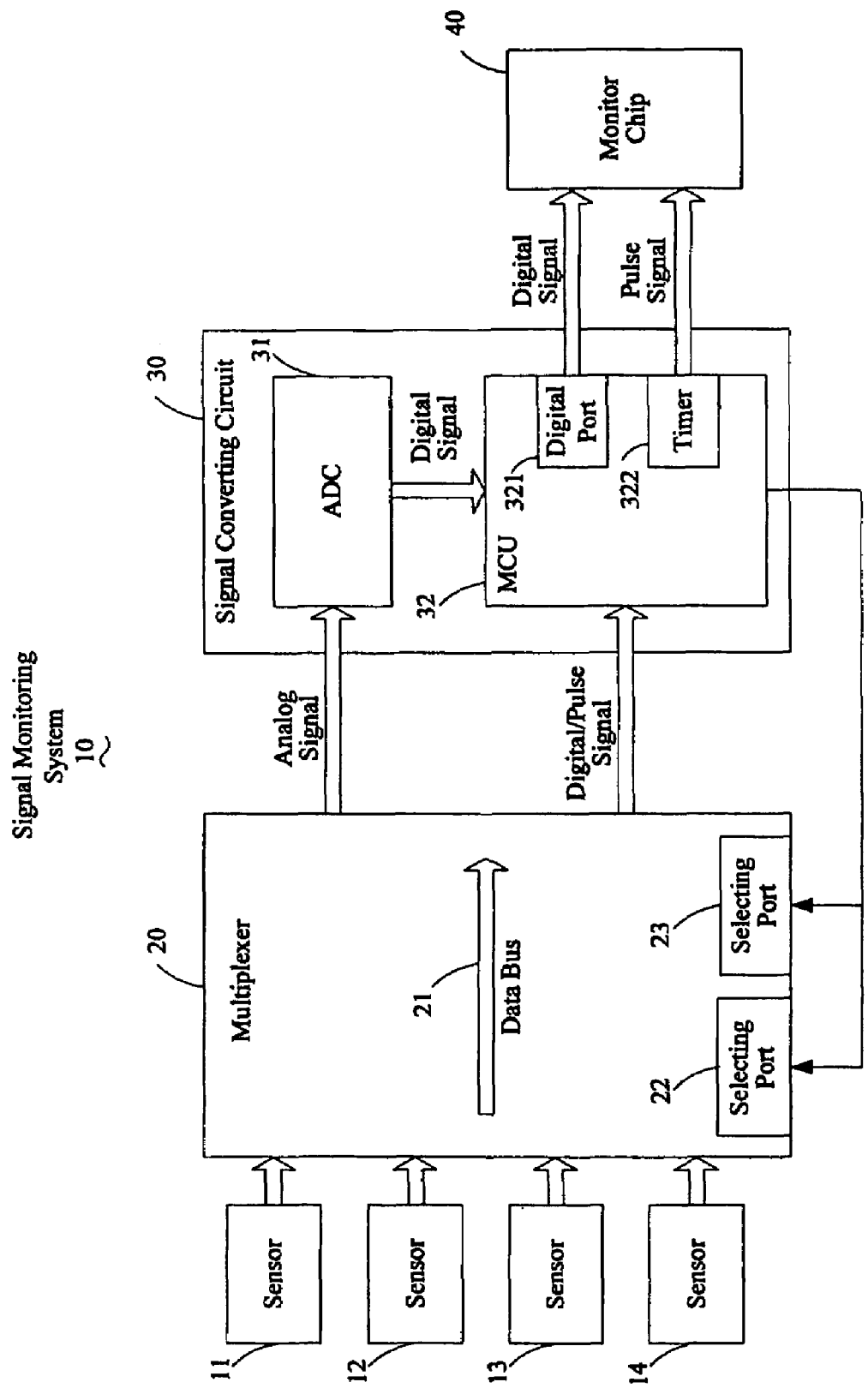
FIG. 1 is a simplified block diagram of hardware infrastructure of an exemplary signal monitoring system according to the present invention.

FIG. 1 is a block diagram of hardware infrastructure of an exemplary signal monitoring system 10 of the present invention. In the exemplary embodiment, the signal monitoring system 10 includes four sensors 11, 12, 13, 14, a multiplexer 20, a signal converting circuit 30, and a monitor chip 40. The sensors 11, 12, 13, 14 are used for generating signals corresponding to detected phenomena of a particular application. The multiplexer 20 is electrically connected to the sensors 11, 12, 13, 14 for receiving the signals generated by the sensors 11, 12, 13, 14. The multiplexer 20 includes two selecting ports 22, 23 for selecting one of the sensors 11, 12, 13, 14 to communicate with the multiplexer 20, and a data bus 21 for transmitting the signals generated by the selected sensor 11, 12, 13, 14. The signal converting circuit 30 includes an analog to digital converter (ADC) 31 electrically connected to the multiplexer 20 for converting analog signals output therefrom to digital signals, and a micro control unit (MCU) 32. The MCU 32 is electrically connected to the multiplexer 20 for receiving digital signals or pulse signals output therefrom, and is electrically connected to the ADC 31 for receiving digital signals output therefrom. Further, the MCU 32 is electrically connected to the selecting ports 22, 23 for sending a voltage signal to each of the selecting ports 22, 23 to select one of the sensors 11, 12, 13, 14 to communicate with the multiplexer 20. The voltage signal sent to each of the selecting ports 22, 23 is a high voltage signal or a low voltage signal. The MCU 32 includes a digital port 321 electrically connected to the monitor chip 40 for outputting digital signals thereto, and a timer 322 electrically connected to the monitor chip 40 for outputting pulse signals thereto. The monitor chip 40 is for processing the digital signals or pulse signals output by the MCU 32.

In the preferred embodiment, a low voltage signal is represented as "0" and a high voltage signal is represented as "1." Therefore a combination of the voltage signals of the selecting ports 22, 23 is represented by a two-digit binary sequence. For example, if both signals of the selecting ports 22, 23 are low voltage signals, the combination of the voltage signals is represented as "00." If both signals of the selecting ports 22, 23 are high voltage signals, the combination of the voltage signals is represented as "11."

At the moment the MCU 32 outputs low voltage signals to both of the selecting ports 22, 23, the combination of the voltage signals of the selecting ports 22, 23 is represented as "00." This voltage signal combination corresponds to selection of the sensor 11. As a result, the sensor 11 is in an active state. That is, the sensor 11 can communicate with the multiplexer 20, and the signals generated by the sensor 11 can be transmitted to the multiplexer 20. The other sensors 12, 13, 14 remain in an inactive state.

At the moment the MCU 32 outputs a low voltage signal to the selecting port 22 and a high voltage signal to the selecting port 23, the combination of the voltage signals of the selecting ports 22, 23 is represented as "01." This voltage signal combination corresponds to selection of the sensor 12. As a result, the sensor 12 is in an active state. That is, the sensor 12 can communicate with the multiplexer 20, and the signals generated by the sensor 12 can be transmitted to the multiplexer 20. The other sensors 11, 13, 14 remain in an inactive state.

At the moment the MCU 32 outputs a high voltage signal to the selecting port 22 and a low voltage signal to the selecting part 23, the combination of the voltage signals of the selecting ports 22, 23 is represented as "10." This voltage signal combination corresponds to selection of the sensor 13. As a result, the sensor 13 is in an active state. That is, the sensor 13 can communicate with the multiplexer 20, and the signals generated by the sensor 13 can be transmitted to the multiplexer 20. The other sensors 11, 12, 14 remain in an inactive state.

At the moment the MCU 32 outputs high voltage signals to both of the selecting ports 22, 23, the combination of the voltage signals of the selecting ports 22, 23 is represented as "11." This voltage signal combination corresponds to selection of the sensor 14. As a result, the sensor 14 is in an active state. That is, the sensor 14 can communicate with the multiplexer 20, and the signals generated by the sensor 14 can be transmitted to the multiplexer 20. The other sensors 11, 12, 13 remain in an inactive state.

Figure 2:
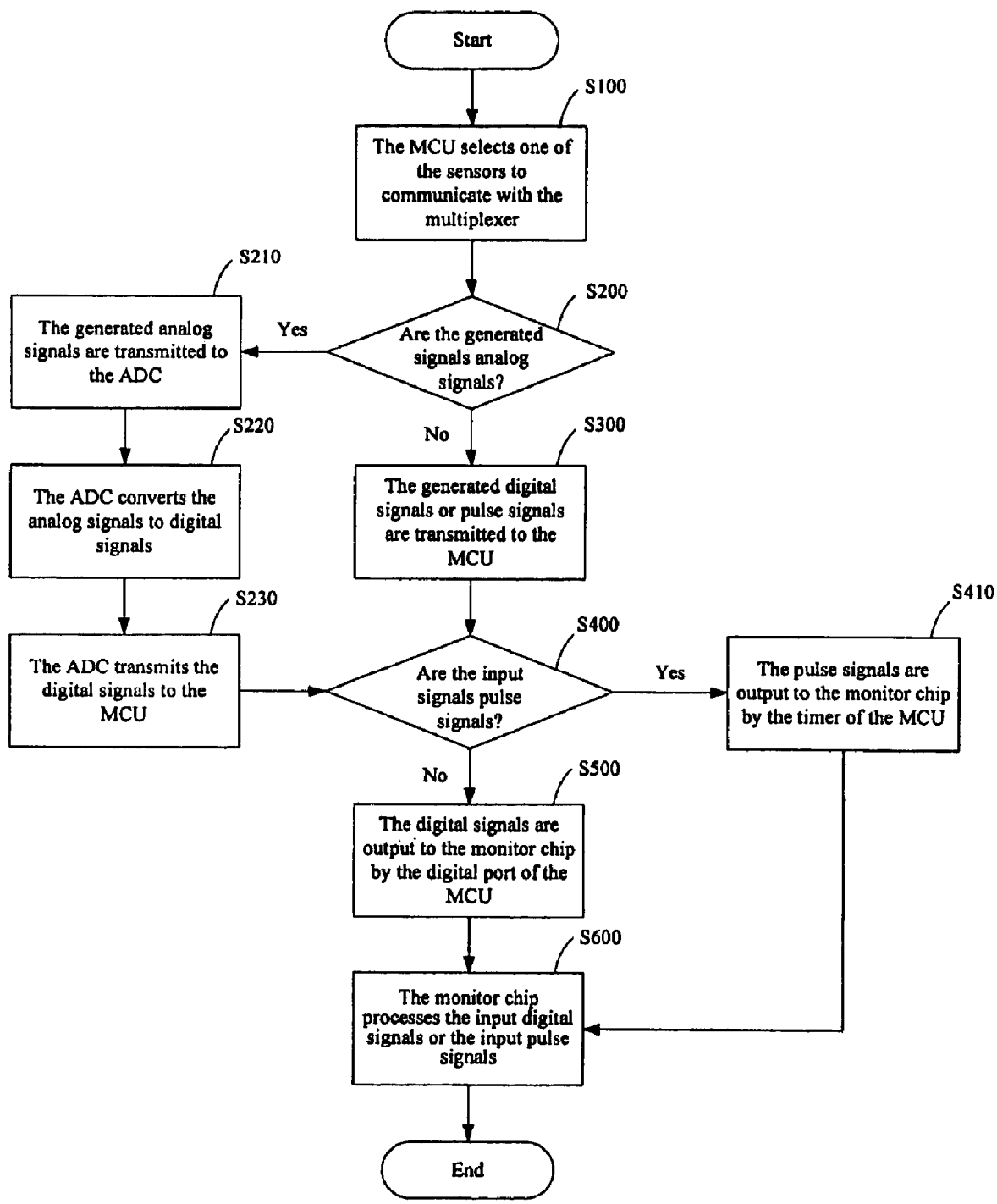
FIG. 2 is a flow chart of an exemplary signal monitoring method according to the present invention.
Figure 3:
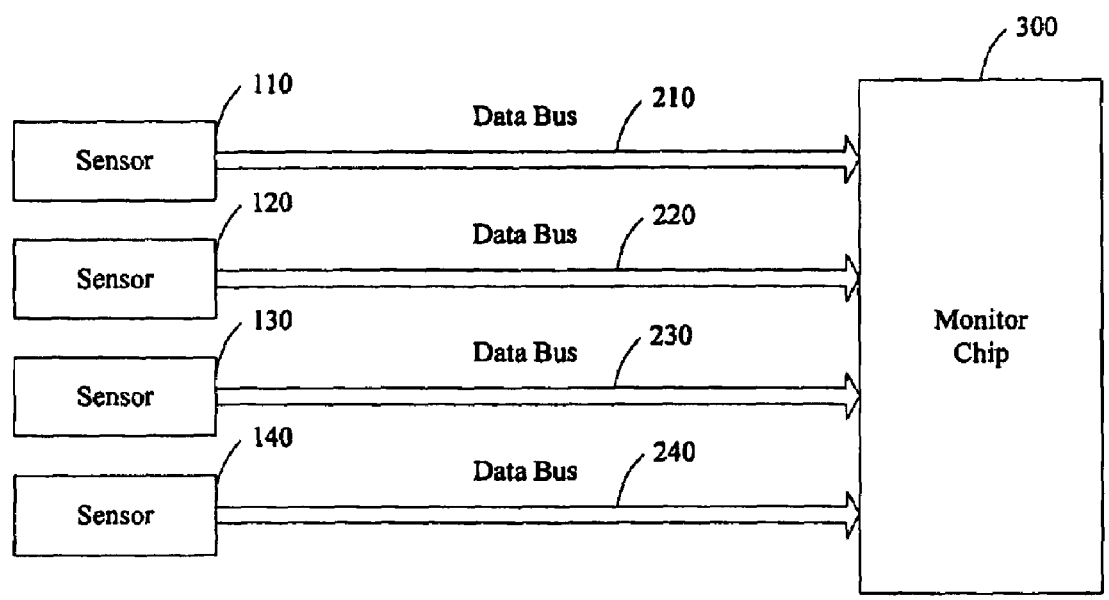
FIG. 3 is a simplified block diagram of hardware infrastructure of a conventional signal monitoring system.

FIG. 2 is a flow chart of the exemplary signal monitoring method that can monitor plural signals by only employing a single data bus. At step S100, the MCU 32 selects one of the sensors 11, 12, 13, 14 to communicate with the multiplexer 20 by sending a voltage signal to each of the selecting ports 22, 23. The voltage signal sent to each of the selecting ports 22, 23 is a high voltage signal or a low voltage signal.

When one of the sensors 11, 12, 13, 14 is selected, the signals generated by the selected sensor 11, 12, 13, 14 are transmitted to the multiplexer 20. At step S200, the multiplexer 20 determines whether the generated signals by the selected sensor are analog signals, or digital signals or pulse signals. If the generated signals are analog signals, at step S210, they are transmitted to the ADC 31 of the signal converting circuit 30. At step S220, the ADC 31 converts the analog signals to digital signals. At step S230, the ADC 31 transmits the digital signals to the MCU 32 of the signal converting circuit 30, whereupon the procedure goes to step S400 described below. On the other hand, if the generated signals are digital signals or pulse signals, at step S300, they are directly transmitted to the MCU 32 of the signal converting circuit 30, whereupon the procedure goes to step S400 described below.

At step S400, the MCU 32 determines whether the input signals are digital signals or pulse signals. If the input signals are pulse signals, at step S410, the pulse signals are output to the monitor chip 40 by the timer 322 of the MCU 32. On the other hand, if the input signals are digital signals, at step S500, the digital signals are output to the monitor chip 40 by the digital port 321 of the MCU 32. At step S600, the monitor chip 40 processes the input pulse signals or the input digital signals.

As described above, the multiplexer 20 of the exemplary embodiment has two selecting ports 22, 23. As a result, the maximum number of sensors supported by the signal monitoring system is limited to four. That is, the number of selecting ports of the multiplexer 20 is a factor which limits the maximum number of sensors. In other embodiments, the signal monitoring system 10 can include more sensors according to particular requirements. In such case, the multiplexer 20 of the signal monitoring system 10 has more selecting ports. For example, the multiplexer 20 may have three or four selecting ports.

Further, while an exemplary system and method of the present invention have been described above, it should be understood that they have been presented by way of example only and not by way of limitation. Thus the breadth and scope of the present invention should not be limited by the above-described exemplary embodiment and method, but should be defined only in accordance with the following claims and their equivalents.

What is claimed is:

1. A signal monitoring method, including the steps of:
   (a) selecting one sensor of a group of sensors to communicate with a multiplexer;
   (b) determining whether signals generated by the selected one sensor are analog signals, or digital signals or pulse signals;
   (c) transmitting the generated signals to an analog to digital converter (ADC) if the generated signals are analog signals, and transmitting the generated signals to a micro control unit (MCU) if the generated signals are digital signals or pulse signals;
   (d) determining whether the generated signals input to the MCU are digital signals or pulse signals;
   (e) outputting the determined digital signals from the MCU to a monitor chip via a digital port of the MCU if the generated signals input to the MCU are digital signals, and outputting the determined pulse signals from the MCU to the monitor chip via a timer of the MCU if the generated signals input to the MCU are pulse signals; and
   (f) processing the digital signals or the pulse signals in the monitor chip.

2. The signal monitoring method of claim 1, wherein the multiplexer includes a plurality of selecting ports, and step (a) further includes the step of sending a voltage signal to each of the selecting ports of the multiplexer.

3. The signal monitoring method of claim 2, wherein the voltage signal sent to each of the selecting ports is a high voltage signal or a low voltage signal.

4. The signal monitoring method of claim 2, wherein step (c) further includes the step of converting the analog signals to digital signals.

5. The signal monitoring method of claim 4, wherein step (c) further includes the step of transmitting the converted analog signals to the MCU.

* * * * *